E. KNAPP.
Grain-Separator.

No. 162,292.

Patented April 20, 1875.

Witnesses
Geo. H. Strong.
Jno. L. Boone.

Inventor
Elijah Knapp
by Dewey & Co
Attys

UNITED STATES PATENT OFFICE.

ELIJAH KNAPP, OF SAN FRANCISCO, CALIFORNIA.

IMPROVEMENT IN GRAIN-SEPARATORS.

Specification forming part of Letters Patent No. 162,292, dated April 20, 1875; application filed March 10, 1875.

*To all whom it may concern:*

Be it known that I, ELIJAH KNAPP, of San Francisco city and county, State of California, have invented an Improved Grain-Separator; and I do hereby declare the following description and accompanying drawings are sufficient to enable any person skilled in the art or science to which it most nearly appertains to make and use my said invention or improvement without further invention or experiment.

My invention relates to improvements in apparatus for separating wheat from barley, and the small grains with which it is usually mixed.

In carrying out my invention, I employ a hopper for the reception of the grain, and a screw in the bottom of the hopper for feeding the grain upon the screen-surfaces. The grain falls upon a compound screen, which is suspended in an inclined position by its four corners from the main frame. This screen is provided with three sifting-surfaces—one above the other—and in its construction and application is not materially different from the screens ordinarily used in separators. Below this screen I mount a screen or sifter at an opposite inclination, and to this screen I impart an up-and-down motion or jar, in the manner described in the following specification, in which reference is had to the accompanying drawing, in which—

Figure 1:
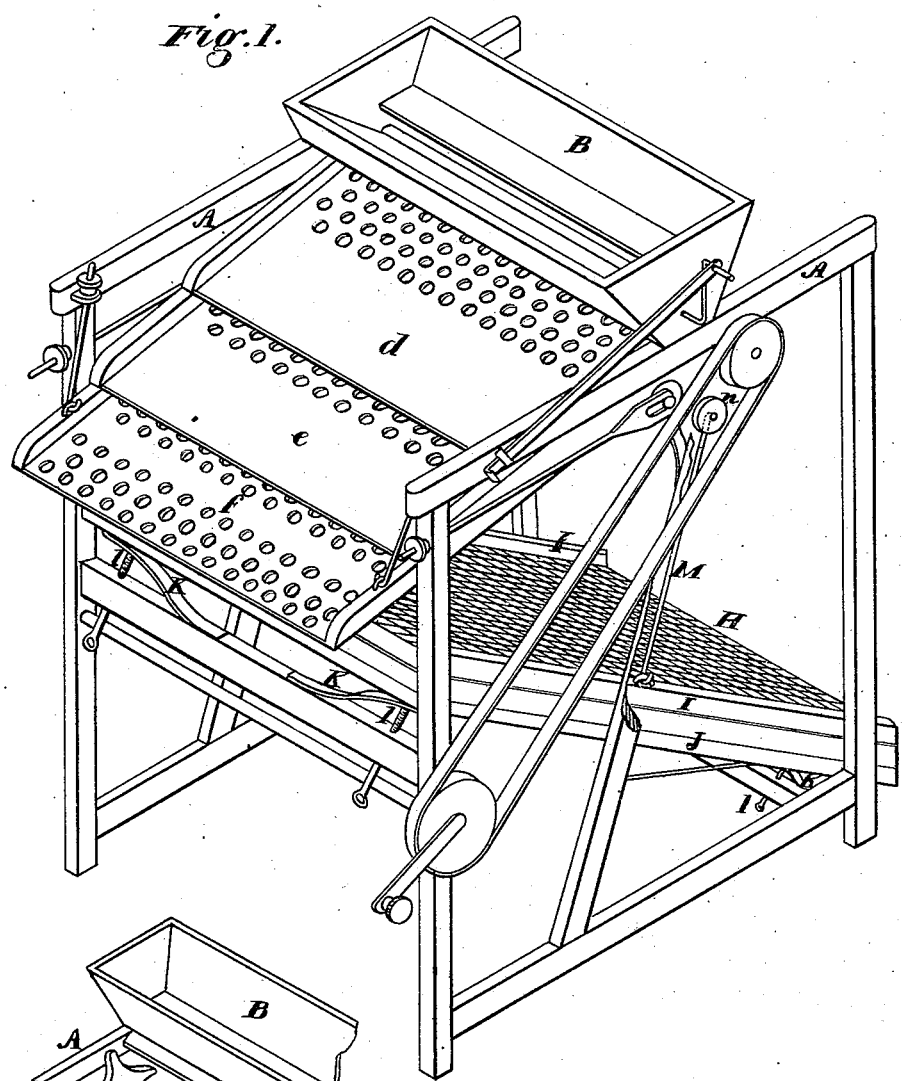
Figure 2:
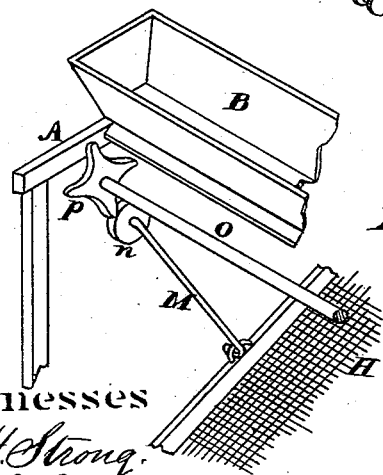

Figure 1 is a perspective view of my grain-separator. Fig. 2 is a sectional view of a part of the machine.

B is the hopper, which is located upon the frame A, in the usual way. The compound screen or shaker, which I suspend in the frame below this hopper, consists of three plates, $d$ $e$ $f$, placed one above another. The upper screen-plate $d$ is shorter than the plate $e$ below it, and the plate $e$ is shorter than the plate $f$. The upper plate $d$ is perforated at its upper end, and these perforations extend about two-thirds of the length of the screen, leaving a plain plate section at the lower ends, as shown. Each lower screen is perforated in a line across their middle, so as to leave a plain surface at their upper ends, and another at their lower ends. The plain section of the plate $d$ overlaps the upper portion of the perforations in the screen-plate $e$, while the plain section of the plate $e$ overlaps the upper perforations of the lower screen-plate $f$. The lower screen-plate $f$ has its lower edge also perforated, as shown. The grain will fall from the hopper upon the upper end of the upper screen-plate $d$, and as the entire screen or shaker is given a shaking motion, the wheat and smaller seeds will pass through the perforations in the plate, and fall upon the upper plain surface of the screen-plate $e$, leaving the barley and larger grains to pass down over the apron or lower plain surface, and fall upon the apron of the lower screen-plate $f$. The grain and small seeds which pass through the perforations of the upper screen will fall upon the upper plain surface of the screen-plate $e$, and will pass down endwise until it comes to the perforated middle portion, when it will pass through and fall upon the plain section of the plates below successively, and finally fall upon the oppositely-inclined screen H below.

Should any wheat or small grain be carried along with the barley over the aprons or lower plain surfaces, they will be separated from it while passing over the perforated lower ends of the screen $f$. The oppositely-inclined screen H, which receives the grain as it falls from the screen-plate $f$, is located in the lower part of the frame A.

This screen is made of wire-cloth, in which the meshes are small enough to prevent the wheat from passing through it, while they are large enough to allow the small seeds and dirt to pass through. This screen is stretched across a frame, I, which has an inclined bottom, J, below the screen.

The frame I, I mount upon springs K K, both at its upper and lower ends, so that it is supported upon them. A screw, $l$, passes loosely through a hole in the end timbers of the frame B, at each corner of the screen-frame, and is screwed into the bottom J. A rod, M, extends upward from the middle of each side of the screen-frame, passes through a staple in the side of the frame, and in the upper end of this rod a roller, $n$, is secured. The drive-shaft $o$ extends across the frame A just above the upper ends of these rods, and secured to the drive-shaft above each of the rollers $n$ is a four-arm cam, $p$. As the shaft $o$ is rotated, the arms of the cam strike the rollers on the upper ends of the rods M successively, and depress them, thus forcing the screen-frame I downward, by compressing the springs upon which it is supported. After the arms pass the rollers, the springs K K will force the screen-frame upward, until the heads of the screws $l$ strike against the under side of the end timbers of the frame. This gives to the screen H a peculiar motion, which will throw the grain upon it upward, and thus keep the meshes clear, while it favors the passage of the small seeds through the screen, so that they will fall upon the bottom J.

When the compression of the supporting-springs is released, they will suddenly react until the heads of the screws strike the timbers, thus producing an upward throw and jar, which is very effective in separating the grain.

Having thus described my invention, what I claim, and desire to secure by Letters Patent, is—

The lower inclined screen H, mounted upon springs K K, and having the screws $l$, or equivalent stop, in combination with the rods M and cam $p$, for imparting to said screen an up-and-down motion and jar, when the jar is produced at the termination of the stroke or motion, substantially as and for the purpose described.

In witness whereof I hereunto set my hand and seal.

ELIJAH KNAPP. [L. S.]

Witnesses:
   JNO. L. BOONE,
   C. M. RICHARDSON.